United States Patent
Dietz et al.

(10) Patent No.: US 7,371,431 B2
(45) Date of Patent: May 13, 2008

(54) METHOD FOR PRODUCING SMALL, SHEET GLASS PLATES AND LARGER SHEET GLASS PLATES AS SEMIFINISHED PRODUCTS FOR PRODUCING THE FORMER

(75) Inventors: Christian Dietz, Mainz (DE); Robert Fuerst, Freising (DE); Christoph Hermanns, Mainz (DE); Heinrich Ostendarp, Mainz (DE); Dietrich Mund, Obersuessbach (DE)

(73) Assignee: Schott AG, Mainz (DE)

( * ) Notice: Subject to any disclaimer, the term of this patent is extended or adjusted under 35 U.S.C. 154(b) by 532 days.

(21) Appl. No.: 10/240,354

(22) PCT Filed: Mar. 24, 2001

(86) PCT No.: PCT/EP01/03385

§ 371 (c)(1),
(2), (4) Date: Feb. 10, 2003

(87) PCT Pub. No.: WO01/74726

PCT Pub. Date: Oct. 11, 2001

(65) Prior Publication Data

US 2003/0148057 A1 Aug. 7, 2003

(30) Foreign Application Priority Data

Apr. 4, 2000 (DE) .............................. 100 16 628

(51) Int. Cl.
*B05D 3/12* (2006.01)
(52) U.S. Cl. .................. 427/289; 427/207.1; 427/290; 427/292; 427/293; 427/555; 427/596

(58) Field of Classification Search ................ 427/289, 427/290, 292, 293, 207.1, 596, 555
See application file for complete search history.

(56) References Cited

U.S. PATENT DOCUMENTS

| | | | | |
|---|---|---|---|---|
| 1,885,245 A * | 11/1932 | Fix | ............................. | 225/101 |
| 3,970,363 A * | 7/1976 | Geyer et al. | ................. | 349/154 |
| 4,120,220 A * | 10/1978 | Mullen | ........................ | 83/886 |
| 4,277,143 A * | 7/1981 | Pauli et al. | .................. | 349/190 |
| 4,300,933 A | 11/1981 | Thomas | ....................... | 65/60.1 |
| 4,300,934 A | 11/1981 | DeTorre | ...................... | 65/60.1 |
| 5,350,613 A * | 9/1994 | Deprez et al. | ................. | 428/43 |
| 5,609,284 A * | 3/1997 | Kondratenko | ................... | 225/1 |
| 5,783,289 A * | 7/1998 | Suzuki et al. | ............. | 428/195.1 |
| 6,498,387 B1 * | 12/2002 | Yang | ........................... | 257/620 |
| 2005/0224827 A1 * | 10/2005 | Mund et al. | .................. | 257/99 |

FOREIGN PATENT DOCUMENTS

DE 33 39 334 C 1/1985

(Continued)

*Primary Examiner*—Elena Tsoy
(74) *Attorney, Agent, or Firm*—Michael J. Striker

(57) ABSTRACT

In the method of producing smaller, sheet glass plates having a predetermined geometry and lateral dimensions in the millimeter range from a larger sheet glass plate, a joining material is imprinted on one side of the larger sheet glass plate in accordance with a joining zone geometry of the smaller, sheet glass plates. Dividing lines along which the smaller, sheet glass plates are separated are specified on the larger sheet glass plate. Then the smaller, sheet glass plates are separated along the dividing lines together with the imprinted joining material into individual sheet glass plates.

12 Claims, 2 Drawing Sheets

FOREIGN PATENT DOCUMENTS

| | | |
|---|---|---|
| DE | 34 00 843 A | 7/1985 |
| DE | 43 05 107 A1 | 8/1994 |
| DE | 693 04 194 T2 | 1/1997 |
| DE | 196 49 332 C1 | 1/1998 |
| DE | 198 30 237 C2 | 10/2001 |
| DE | 199 59 921 C1 | 10/2001 |
| EP | 0 062 484 A | 10/1982 |
| EP | 0 872 303 A | 10/1998 |
| JP | 62-70241 | 3/1987 |
| JP | 06123744 A * | 5/1994 |
| JP | 08023085 A * | 1/1996 |
| WO | 99 46211 A | 9/1999 |

* cited by examiner

METHOD FOR PRODUCING SMALL, SHEET GLASS PLATES AND LARGER SHEET GLASS PLATES AS SEMIFINISHED PRODUCTS FOR PRODUCING THE FORMER

CROSS-REFERENCE

This is the U.S. National Stage of PCT/EP 01/03385, filed Mar. 24, 2001, on which priority Is based, and has been filed in accordance with 35 U.S.C. 371.

BACKGROUND OF THE INVENTION

The invention concerns a method for producing small, sheet glass plates having a specified geometric structure and lateral expansions in the millimeter range by removing them from a larger sheet glass plate.

The invention further concerns such a larger sheet glass plate having dimensions in the centimeter range as a semifinished product for producing the small, sheet glass plates having lateral expansions in the millimeter range.

Small, sheet glass plates of the aforementioned type are needed in certain technical fields, in particular for the production of electronic components.

For example, small containers, among other things, that are closed completely or partially on at least one side by a sheet glass plate are used to house micro-and optoelectronic components such as vibrating quartz crystals, SAW filters, CCD components, the "electronic packaging". Housing covers made of sheet glass are also used frequently in the housing of micro-and optoelectronic components. The thickness s of these small sheet glass plates is typically in the range of $10 \: \mu m \leq s \leq 500 \: \mu m$. Sheet glass plates having the most diverse geometry (rectangular, circular, etc.) are used in this application. The edge length and/or diameter of such plates made of sheet glass typically measure only a few millimeters in size.

Small sheet glass plates are also used as structural components in the production of microelectronic and micromechanical components. It is made known in DE 196 49 332, for example, that a vibrating quartz crystal is positioned directly between two sheet glass plates and interconnected with them. Bonded structures of this type have a minimal height and are capable of being placed and contacted on a printed-circuit board or a base plate.

In this application of sheet glass as an element for closing a housing for micro-and optoelectronic components, as well as a structural element of microelectronic or micromechanical components, the bond is typically formed by means of adhesive bonding or soldering. In the case of soldering, metal or glass solder is used as the joining material. Glass solder is used in the majority of applications.

The production of small, sheet glass plates of this type is typically carried out according to the related art (Derwent abstract of JP 62-070241) by removing them from larger sheet glass plates. The separating procedure is carried out by means of abrasive cutting or boring using rotating diamond tools. At the same time, higher requirements are placed on the quality of the edges, since they have a decisive influence on the strength of the sheet glass plate.

The sheet glass plates are typically divided initially in the manner described previously and then subjected to the subsequent further processing steps (assembly and joining process). In the case of the joining technique currently used in many housing applications, the sheet glass plates are bonded with the housing by means of a soldering process. In the majority of applications, the soldering material is applied to the glass using a dispenser. The soldering material is typically applied in the edge region of the sheet glass plates and therefore usually forms a thin, closed, frame-shaped contour. Glass or metal solder is typically used. Another method of applying the soldering material to the joining zone that is also used to a certain extent in common practice is the use of presintered solder frames. In this application, the sheet glass plates and a free and likewise very thin, presintered solder frame made of glass solder must be positioned and partially fixed in position relative to each other and relative to the housing with which the sheet glass plates are to be bonded.

In the case of this further processing method, problems occur with handling and positioning due to the minimal lateral expansion, thickness and mass of the sheet glass plates, as well as the solder frame used. This handling problem occurs to a greater extent, in particular, when thin, free solder frames are used. On the one hand, the thin glass plates are comparably susceptible to breakage and, on the other, the ratio of gravitational force to the adhesive forces occuring during handling is low. In particular, lifting the individual sheet glass plates and the solder frame in defined fashion is difficult, so that the individual components must be handled manually in the majority of cases. This manual handling is time-consuming and personnel-intensive, which makes it cost-intensive. Moreover, waste due to breakage and contamination increases when this type of handling is used and during transport of the individual sheet glass plates.

SUMMARY OF THE INVENTION

The invention is based on the object of performing the method described initially for producing small, sheet glass plates having a specified geometric structure and lateral expansions in the millimeter range by removing them from a larger sheet glass plate, and for developing such larger sheet glass plates as semifinished products for producing the small, sheet glass plates in such a fashion that transport of the small plates is simpler and the production sequence of the individual small plates is more streamlined, and in such a fashion that the handling—in particular of the individual sheet glass plates—before the joining process is simpler and capable of being better automated.

With regard for the method, the object is attained according to the invention with the steps:
  Imprint the larger sheet glass plates on one side with a joining material in accordance with the joining zone geometry of the small, sheet glass plates to be removed, while specifying the desired dividing lines, and
  Separate the small, sheet glass plates with the imprinted joining material into singles by subsequently separating them along the desired dividing lines.

According to a further development of the invention, before the plates are separated into singles, the larger sheet glass plate is preferably scribed along the desired dividing lines at a specified depth using a laser beam.

With regard for the larger sheet glass plate having lateral dimensions in the centimeter range as a semifinished product for producing small, sheet glass plates having a specified geometric structure and lateral dimensions in the millimeter range, the object is attained according to the invention by providing the larger sheet glass plate with a joining material on one side in accordance with the joining zone geometry of the small, sheet glass plates to be removed while specifying the desired dividing lines, and scribing it up to a specified depth preferably along the desired dividing lines.

The core of the invention, therefore, is to product a larger sheet glass substrate plate structured in accordance with the geometry of the small, sheet glass plates that is not separated into individual small, sheet glass plates until immediately before the joining process. A larger sheet glass plate of this type still joined initially can have the special feature that the joining filler material is already applied to the top side of the glass substrate and is permanently bonded with the glass substrate. Furthermore, a large, sheet glass plate of this nature is preferably provided with a fissure structure on the bottom side in accordance with the geometry of the smaller, sheet glass plates that allows the sheet glass plate to be separated into geometrically defined, individual plates having high-quality edges by means of simple mechanical breakage immediately before the joining process. The plates can also be separated into singles by means of thermally induced, locally-acting mechanical tensions, e.g., by partial exposure to a laser.

The advantages of the invention are simpler transport of the plates and, in particular, a more streamlined production sequence of the individual small, sheet glass plates, and the possibility of simplifying and better automating the handling and/or positioning of the small, sheet glass plates immediately before the joining process.

Another possibility for improving the production and covering process of electronic components using thin glass plates is to initially join (solder) all of the structured sheet glass plates with the corresponding number of associated housing components and to separate them into singles by means of mechanical breakage once this joining process is completed. The plates could also be separated (broken) using a method that is not entirely mechanical. Instead, they could be separated into singles by means of thermally induced, locally-acting, mechanical tensions, e.g., by partial exposure to a laser.

The joining of the individual small, sheet glass plates to other components, in particular with the edge of flat components, is advantageously simplified when a frame-like structure of the joining material having a specified frame width and that extends peripherally along the desired dividing lines is imprinted on the small, sheet glass plates to be removed.

The larger sheet glass plate is advantageously imprinted with joining material by means of screen printing, which ensures an economical and effective production of the appropriate geometric structure. Other printing techniques are also usable in principle, such as stencil printing.

Glass solder is preferably used as the joining material that is easy to process using the conventional printing techniques—screen printing in particular—and that adheres well to the sheet glass plates.

Drawn borosilicate glass is particularly suited to use as the glass material for the sheet glass plates; it has the mechanical and chemical properties required for use in small, sheet glass plates.

Particular handling advantages are obtained in the production of the individual small, sheet glass plates when, according to a further development of the invention, the imprinted and scribed, larger sheet glass plate is placed on a substrate, in particular a plastic carrier film to which tension is applied, preferably using mechanical means. As a result, a further development of the invention is possible in which the imprinted, larger sheet glass plate is placed unscribed on the substrate and separated into the small, sheet glass plates by means of an abrasive cutting process.

BRIEF DESCRIPTION OF THE DRAWING

Further embodiments of the invention result from the description of two exemplary embodiments shown in the drawings.

DETAILED DESCRIPTION OF THE INVENTION

Figure 1:
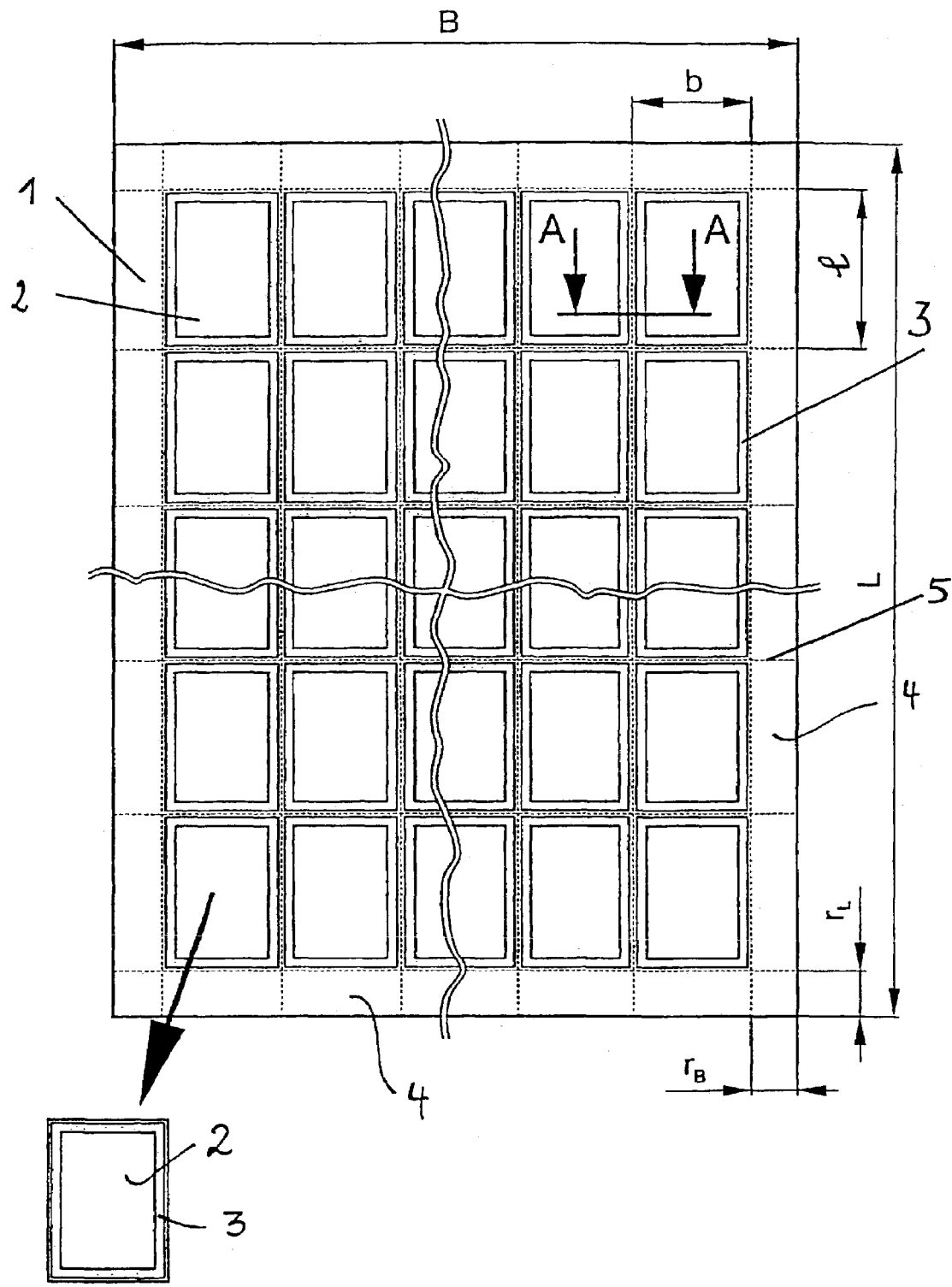
FIG. 1 is a top view of a first exemplary embodiment of a larger sheet glass plate structured and scribed according to the invention that serves as a semifinished product for producing smaller, rectangular, sheet glass plates.
Figure 2:
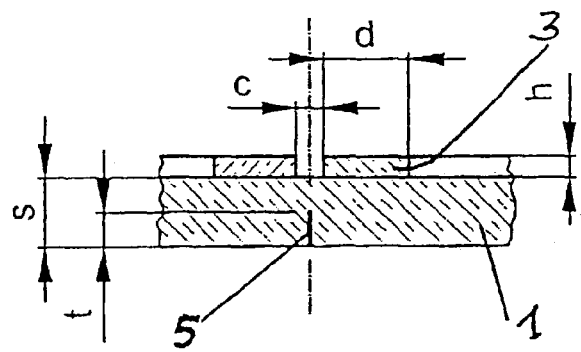
FIG. 2 is a cross-sectional view along the line of cut A-A in FIG. 1.

FIG. 1, in combination with the cross-sectional drawing according to FIG. 2, shows a larger sheet glass plate 1 structured according to the invention using a rectangular geometry as an example. This sheet glass plate 1 has edge lengths B and L, which are in the range of multiple centimeters.

The aforementioned larger sheet glass plate 1 is subdivided into smaller, likewise rectangular segments having edge lengths b and $\ell$ in accordance with the geometry of the smaller, sheet glass plates to be isolated, i.e., to be separated into singles, one of which is shown removed in the separated state. These edge lengths of the smaller, sheet glass plates 2 are in the range of a few millimeters. Each segment forming the respective eventually smaller, sheet glass plate 2 has a solder frame 3 made of glass solder applied in the edge region that is developed in accordance with the subsequent joining zone geometry, which is also rectangular in this example.

The solder frame structures 3 made of glass solder forming as a result on the surface of the sheet glass plate 1 are applied using screen or stencil printing in one or more passes. The typical solder frame width "d" (FIG. 2) is in the range of 300 µm $\leq$ d $\leq$ 900 µm. The thickness "h" of the imprinted solder frame structures 3 is typically in the range of 15 µm $\leq$ h $\leq$ 200 µm. The distance "c" between the solder frames 3 is typically in the range of 0 µm $\leq$ c $\leq$ 500 µm.

The large, sheet glass plate 1 has a peripheral edge 4 that is not coated with solder material. The edge widths ($r_B r_L$) are typically in the range of many millimeters.

The sheet glass plate 1 is subdivided into the smaller segments, i.e., the smaller, sheet glass plates 2, using a fissure structure 5—illustrated using broken lines—applied to the back side. The fissures extend from the surface of the underside of the larger sheet glass plate 1 outward and have a depth t that is smaller than the thickness s of the glass substrate (FIG. 2).

The fissures 5 defined in terms of their extent and depth and applied to the back side are preferably applied by means of thermally induced tensions created by laser exposure. These fissures preferably extend in a straight line over the entire larger sheet glass plate 1.

Laser beam-scribing processes of this type, which induce a thermal mechanical tension up to above the breaking strength of the material at a predetermined depth by means of local heat generation caused by the focussed laser beam in combination with externally-applied cooling, have been made known in numerous publications, e.g., in EP 0 872 303 A2, DE 693 04 194 T2, and DE 43 05 107 C2.

The aforementioned laser beam-scribing procedures differ in particular by the configuration of the focal spot. The method according to DE 693 04 194 T2, for example, uses a laser beam with an elliptical cross section followed by a cold jet of air.

EP 0 872 303 A2 describes a laser beam-scribing procedure that provides a focal spot having a U or V-shaped contour that opens in the direction of separation. Contours derived from this, such as X-shaped focal spots, are also described.

A laser beam-scribing procedure is made known in DE 43 05 107 C2 in which the laser beam is shaped in such a fashion that its beam cross section has a linear shape on the surface of the work piece, and in which the ratio of length and width of the impacting beam cross section can be adjusted.

As a result of the older patent application 198 30 237.1-45, the related art also includes producing a punctiform focal spot having a cool zone concentric therewith.

As a result of the older patent application 199 59 921.1, the related art also includes special linear cutting spots having maxima of intensity at their ends.

All of these focal spots can be used within the scope of the invention for scribing the larger sheet glass plate 1.

Due to the method-specific advantages of laser beam-scribing, damage that exceeds a permissible level does not occur on the edges of the small, sheet glass plates 2 after the larger sheet glass plate 1 is broken apart, so that edges do not require abrading reworking.

In addition to other glass materials, drawn borosilicate glass from the SCHOTT DESAG company, type D263 or AF45, having a thickness in the range of 100 µm≦s≦500 µm is preferably used as the glass material for the sheet glass plate 1.

A sheet glass plate 1 structured in the aforementioned-described manner is comparably easy to handle and separate into small individual plates 2 by means of simple mechanical breaking.

Figure 3:
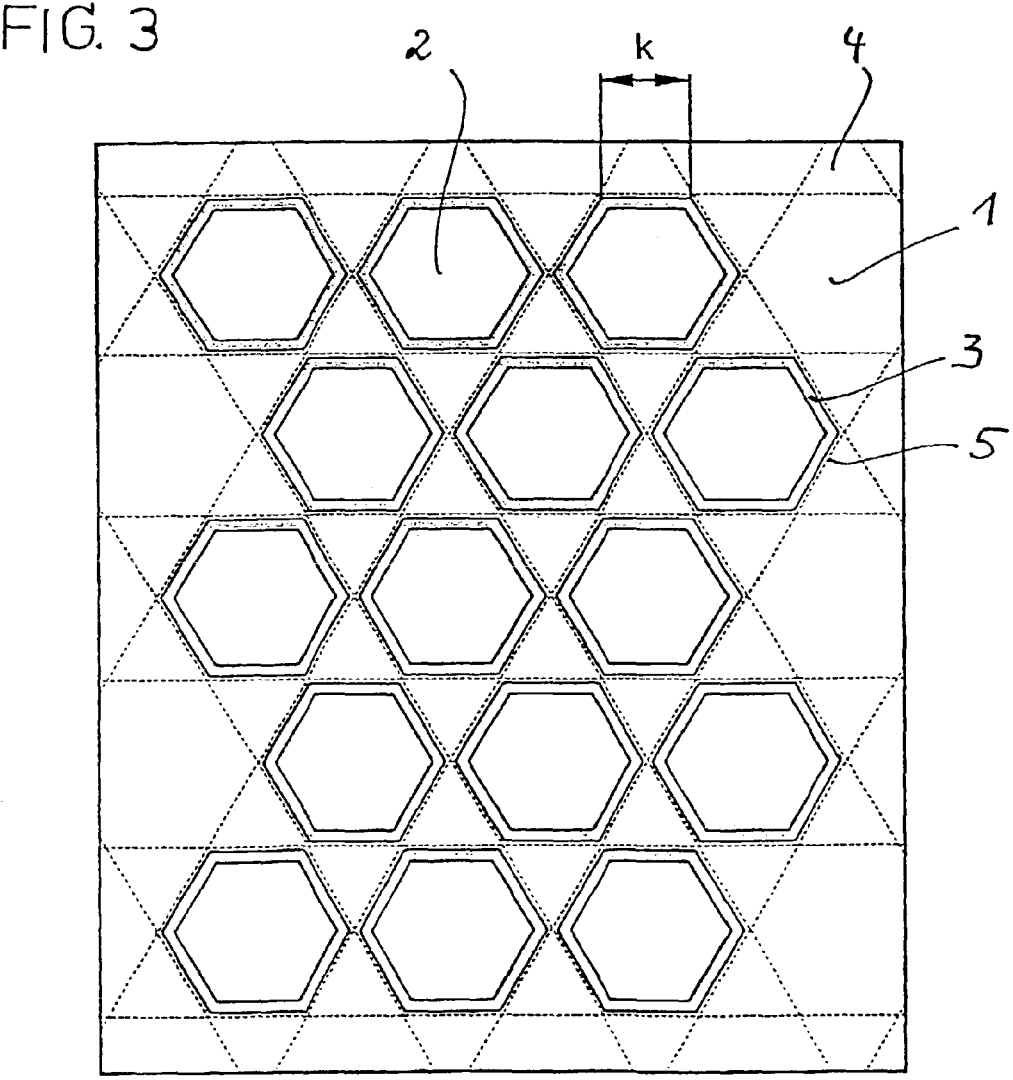
FIG. 3 is a top view of a further exemplary embodiment of the sheet glass plate-semifinished product having hexagonal structures developed according to the invention.

In addition to the rectangular structure of the small, sheet glass plates 2 shown in FIG. 1, a polygonal structure according to FIG. 3 or rounded structures (a circular contour, for example) can be used as well. In these cases, the edge length k and the diameter of the small, sheet glass plates are also in the range of a few millimeters. If round structures are used, the course of the fissure 5 does not form a straight line; instead, it is adapted to the contour geometry of the structures. The shape of the larger sheet glass plate 1 does not necessarily have to be rectangular, either. Polygonal or round or partially round disks (wafers) can also be used.

It is also possible to place the imprinted and scribed, larger sheet glass plate 1 on a plastic carrier film or another substrate. By placing the carrier film under tension (stretching) over a frame suited for this purpose, tensile forces can be directed into the carrier film and, therefore, into the larger sheet glass plate as well. This results in the plate breaking apart along the fissures 5, and therefore results in the larger sheet glass plate 1 separating into smaller, individual plates. The small, sheet glass plates produced adhere to the carrier film, they have a defined position, and they can therefore be lifted and removed in automated fashion.

If a plastic film or another substrate is used for holding/fixing in position, it is also possible to scribe the sheet glass plate without using laser beam-processing and subsequent separation by application of mechanical force. Instead, separation can be carried out immediately by means of abrasive cutting along the dividing lines provided therefore. The distance of the solder frame c from the substrate glass plate is then in the range of the thickness of the parting-off tool and/or the kerf width that is produced. The typical kerf width is multiple 0.1 mm.

What is claimed is:

1. A method of producing smaller, sheet glass plates having a predetermined geometry and lateral dimensions in the millimeter range by separation of the smaller, sheet glass plates from a larger uncoated sheet glass plate, said method consisting of the steps of:
   a) imprinting the larger uncoated sheet glass plate on one side with a joining material in accordance with a joining zone geometry of the smaller, sheet glass plates;
   b) specifying dividing lines on a back side of the larger uncoated sheet glass plate opposite from the one side on which the joining material is provided;
   c) prior to the separating of the smaller, sheet glass plates from the larger uncoated sheet glass plate, scribing the larger uncoated sheet glass plate along the dividing lines on the back side of the larger uncoated sheet glass plate to a predetermined depth using a laser beam to form a plurality of fissures on the back side; and
   d) after the scribing with the laser beam, separating the smaller, sheet glass plates from the larger uncoated sheet glass plate by breaking the larger uncoated sheet glass plate apart along the fissures.

2. The method according to claim 1, wherein the separating of the smaller, sheet glass plates from the larger uncoated sheet glass plate comprises mechanically breaking the smaller, sheet glass plates from the larger uncoated sheet glass plate to form the individual sheet glass plates.

3. The method according to claim 1, wherein the separating of the smaller, sheet glass plates from the larger uncoated sheet glass plate takes piece by means of thermally-induced, locally-acting, mechanical tensions.

4. The method as defined in claim 3, wherein the thermally induced, locally-acting mechanical tensions are produced by means of partial exposure to a laser.

5. The method according to claim 1, wherein a frame-like structure of the joining material is imprinted on the larger, uncoated sheet glass plate and said frame-like structure has a predetermined frame width and extends peripherally along the dividing lines on the smaller, sheet glass plates to be separated.

6. The method according to claim 1, wherein the imprinting takes place by means of screen printing or stencil printing.

7. The method according to claim 1, wherein the joining material comprises a glass solder.

8. The method according to claim 1, wherein the larger uncoated sheet glass plate consists of borosilicate glass.

9. A method for producing smaller, sheet glass plates having a predetermined geometry and lateral dimensions in the millimeter range by separation of the smaller, sheet glass plates from a larger uncoated sheet glass plate, said method consisting of the steps of:
   a) placing the larger uncoated sheet glass plate on a substrate;
   b) imprinting the larger uncoated sheet glass plate on one side with, joining material in accordance with a joining zone geometry of the smaller, sheet glass plates;
   c) specifying dividing lines on the larger uncoated sheet glass plate, along which said smeller, sheet glass plates to be removed from the larger uncoated sheet glass plate are separated; and d) separating the smaller, sheet glass plates with the imprinted joining material along the dividing lines on the larger uncoated sheet glass plate to form individual sheet glass plates.

10. The method according to claim 9, wherein the substrate is a plastic carrier film arranged on a frame: the placing of the larger uncoated sheet glass plate on the substrate occurs so that the larger uncoated sheet glass plate adheres to the plastic carrier film after the imprinting of the joining material and the specifying of the dividing lines on a back side of the larger uncoated sheet glass plate and the separating comprises scribing the larger uncoated sheet glass plate on the back side of the lamer uncoated sheet glass plate along the dividing lines to a predetermined depth using a laser beam to form a plurality of fissures on the back side and, after the scribing, the imprinting and the placing, putting the plastic carrier film under tension so that tensile forces are transferred into the larger uncoated sheet glass plate so that the smaller sheet glass plates are thus separated from the larger uncoated sheet glass plate but adhere to the plastic carrier film and then lifting and removing the smaller, sheet glass plates from the plastic carrier film.

11. The method according to claim 9, wherein the larger uncoated sheet glass plate is placed unscribed on the substrate and divided into the smaller, sheet glass plates by means of an abrasive cutting process.

12. The method as defined in claim 1, wherein said larger uncoated sheet glass plate consists of drawn borosilicate glass and has a thickness of from 100 μm to 500 μm).

* * * * *